United States Patent
Robbins

(10) Patent No.: US 8,116,302 B1
(45) Date of Patent: Feb. 14, 2012

(54) METHOD AND SYSTEM FOR PROVIDING CALL SCREENING IN A PACKET-SWITCHED NETWORK

(75) Inventor: David C Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 232 days.

(21) Appl. No.: 11/534,230

(22) Filed: Sep. 22, 2006

Related U.S. Application Data

(60) Provisional application No. 60/719,465, filed on Sep. 22, 2005.

(51) Int. Cl.
*H04L 12/66* (2006.01)
*H04M 3/22* (2006.01)
*H04M 3/436* (2006.01)
*H04M 3/54* (2006.01)

(52) U.S. Cl. ............ 370/356; 379/32.01; 379/196; 379/211.02

(58) Field of Classification Search .......... 370/352, 370/356; 379/221.09, 229, 32.01–32.04, 379/35, 201.01, 211.02–211.05, 188, 196–200
See application file for complete search history.

(56) References Cited

U.S. PATENT DOCUMENTS

| | | | |
|---|---|---|---|
| 3,737,587 A | 6/1973 | Romero | |
| 4,154,987 A | 5/1979 | Rosenberg et al. | |
| 4,528,424 A | 7/1985 | Middleton et al. | |
| 4,723,271 A | 2/1988 | Grundtisch | |
| 4,741,024 A | 4/1988 | Del Monte et al. | |
| 4,950,011 A | 8/1990 | Borcea et al. | |
| 5,165,095 A | 11/1992 | Borcherding | |
| 5,323,444 A | 6/1994 | Ertz et al. | |
| 5,471,519 A * | 11/1995 | Howe et al. | 379/88.26 |
| 5,619,561 A | 4/1997 | Reese | |
| 5,815,550 A | 9/1998 | Miller | |
| 5,835,570 A | 11/1998 | Wattenbarger | |
| 5,913,166 A | 6/1999 | Buttitta et al. | |
| 5,970,134 A | 10/1999 | Highland et al. | |
| 5,999,610 A | 12/1999 | Lin et al. | |
| 6,021,176 A * | 2/2000 | McKendry et al. | 379/35 |
| 6,026,156 A | 2/2000 | Epler et al. | |
| 6,031,896 A * | 2/2000 | Gardell et al. | 379/88.17 |
| 6,208,726 B1 | 3/2001 | Bansal et al. | |
| 6,219,414 B1 | 4/2001 | Maciejewski et al. | |
| 6,337,898 B1 * | 1/2002 | Gordon | 379/67.1 |
| 6,339,639 B1 | 1/2002 | Henderson | |
| 6,404,876 B1 | 6/2002 | Smith et al. | |
| 6,484,196 B1 | 11/2002 | Maurille | |
| 6,510,315 B1 | 1/2003 | Arnson | |
| 6,636,594 B1 | 10/2003 | Oran | |
| 6,735,295 B1 | 5/2004 | Brennan et al. | |
| 6,741,695 B1 * | 5/2004 | McConnell et al. | 379/229 |

(Continued)

OTHER PUBLICATIONS www.carrollcommunications.com/ipoffice/5donotdisturb.html, p. 1 to 2, Nov. 6, 2007.

(Continued)

*Primary Examiner* — Harry S Hong

(57) ABSTRACT

Embodiments of the invention provide systems and methods for determining whether a call in a packet-switched network to a first destination is to be forwarded, forwarding the call to a second destination based on a determination that the call is to be forwarded, notifying the first destination that the call has been forwarded, receiving a request from the first destination to screen the call, and enabling the first destination to screen the call.

17 Claims, 6 Drawing Sheets

Figure 6

U.S. PATENT DOCUMENTS

| | | | |
|---|---|---|---|
| 6,744,877 B1 | 6/2004 | Edwards | |
| 6,754,325 B1 | 6/2004 | Silver et al. | |
| 6,801,604 B2 | 10/2004 | Maes et al. | |
| 6,807,259 B1* | 10/2004 | Patel et al. | 379/142.01 |
| 6,834,048 B1 | 12/2004 | Cho et al. | |
| 6,856,616 B1 | 2/2005 | Schuster et al. | |
| 6,857,072 B1 | 2/2005 | Schuster et al. | |
| 6,870,830 B1 | 3/2005 | Schuster et al. | |
| 6,876,632 B1 | 4/2005 | Takeda | |
| 6,879,673 B2 | 4/2005 | Creamer et al. | |
| 6,954,521 B2 | 10/2005 | Bull et al. | |
| 6,954,524 B2 | 10/2005 | Gibson | |
| 6,961,332 B1 | 11/2005 | Li et al. | |
| 6,963,633 B1 | 11/2005 | Diede et al. | |
| 6,996,605 B2 | 2/2006 | Low et al. | |
| 7,020,130 B2 | 3/2006 | Krause et al. | |
| 7,031,700 B1 | 4/2006 | Weaver et al. | |
| 7,082,193 B2 | 7/2006 | Barclay et al. | |
| 7,085,253 B2 | 8/2006 | Yang | |
| 7,130,282 B2 | 10/2006 | Black | |
| 7,145,997 B2 | 12/2006 | Poikselka et al. | |
| 7,203,293 B1* | 4/2007 | Bedingfield | 379/142.01 |
| 7,224,792 B2 | 5/2007 | Fusco | |
| 7,257,837 B2 | 8/2007 | Xu et al. | |
| 7,260,201 B2 | 8/2007 | Jorasch et al. | |
| 7,274,662 B1* | 9/2007 | Kalmanek et al. | 370/230 |
| 7,283,517 B2 | 10/2007 | Yan et al. | |
| 7,290,288 B2 | 10/2007 | Gregg et al | |
| 7,295,577 B2 | 11/2007 | Moody et al. | |
| 7,301,913 B2 | 11/2007 | Corrao et al. | |
| 7,406,696 B2 | 7/2008 | Burger et al | |
| 7,426,265 B2* | 9/2008 | Chen et al. | 379/211.02 |
| 7,440,440 B1 | 10/2008 | Abichandani et al. | |
| 7,460,657 B1 | 12/2008 | Baeza | |
| 7,489,771 B2 | 2/2009 | McMurry et al. | |
| 7,580,497 B2 | 8/2009 | Wang et al. | |
| 7,593,389 B2 | 9/2009 | Vance | |
| 7,599,355 B2 | 10/2009 | Sunstrum | |
| 7,609,700 B1 | 10/2009 | Ying et al. | |
| 7,609,706 B2 | 10/2009 | Scott et al. | |
| 7,630,481 B2 | 12/2009 | Kafka | |
| 7,715,413 B2 | 5/2010 | Vaziri et al. | |
| 7,743,141 B2 | 6/2010 | Wang et al. | |
| 7,773,581 B2 | 8/2010 | Punj et al. | |
| 7,860,089 B2 | 12/2010 | Tripathi et al. | |
| 2002/0038388 A1 | 3/2002 | Netter | |
| 2002/0114318 A1 | 8/2002 | Rines | |
| 2002/0131447 A1 | 9/2002 | Krishnamurthy et al. | |
| 2002/0136359 A1 | 9/2002 | Stumer et al. | |
| 2002/0136363 A1 | 9/2002 | Stumer et al. | |
| 2002/0141548 A1 | 10/2002 | Boda | |
| 2003/0028806 A1 | 2/2003 | Govindarajan et al. | |
| 2003/0043992 A1 | 3/2003 | Wengrovitz | |
| 2003/0088421 A1 | 5/2003 | Maes et al. | |
| 2003/0231759 A1 | 12/2003 | Bedingfield, Sr. et al. | |
| 2004/0030750 A1 | 2/2004 | Moore et al. | |
| 2004/0051900 A1 | 3/2004 | Sagiya et al. | |
| 2004/0082324 A1 | 4/2004 | Ayoub | |
| 2004/0090954 A1 | 5/2004 | Zhang et al. | |
| 2004/0148395 A1 | 7/2004 | Schulzrinne | |
| 2004/0207724 A1 | 10/2004 | Crouch et al. | |
| 2004/0240656 A1 | 12/2004 | Poustchi | |
| 2004/0249951 A1 | 12/2004 | Grabelsky et al. | |
| 2004/0264406 A1 | 12/2004 | Pattenden et al. | |
| 2005/0013421 A1 | 1/2005 | Chavez et al. | |
| 2005/0043014 A1 | 2/2005 | Hodge | |
| 2005/0069104 A1 | 3/2005 | Hanson et al. | |
| 2005/0078642 A1 | 4/2005 | Mayer et al. | |
| 2005/0123104 A1 | 6/2005 | Bishop et al. | |
| 2005/0129219 A1 | 6/2005 | Williamson | |
| 2005/0147227 A1 | 7/2005 | Chervirala et al. | |
| 2005/0190721 A1 | 9/2005 | Pershan | |
| 2005/0193338 A1 | 9/2005 | Hawkins et al. | |
| 2005/0195802 A1 | 9/2005 | Klein et al. | |
| 2005/0201530 A1 | 9/2005 | Koch et al. | |
| 2005/0213716 A1 | 9/2005 | Zhu et al. | |
| 2005/0215243 A1 | 9/2005 | Black et al. | |
| 2005/0226217 A1 | 10/2005 | Logemann et al. | |
| 2005/0237978 A1 | 10/2005 | Segal | |
| 2005/0249196 A1 | 11/2005 | Ansari et al. | |
| 2005/0286466 A1 | 12/2005 | Tagg et al. | |
| 2006/0033809 A1 | 2/2006 | Farley | |
| 2006/0039389 A1 | 2/2006 | Burger et al. | |
| 2006/0062210 A1 | 3/2006 | Dharanikota | |
| 2006/0062251 A1 | 3/2006 | Lim et al. | |
| 2006/0067300 A1 | 3/2006 | Poustchi et al. | |
| 2006/0067504 A1 | 3/2006 | Goldman et al. | |
| 2006/0140379 A1 | 6/2006 | Yamamoto et al. | |
| 2006/0140380 A1 | 6/2006 | Croak et al. | |
| 2006/0146737 A1 | 7/2006 | Sandgren et al. | |
| 2006/0177030 A1 | 8/2006 | Rajagopalan et al. | |
| 2006/0177044 A1 | 8/2006 | O'Neil et al. | |
| 2006/0178130 A1 | 8/2006 | Makrygiannis | |
| 2006/0203986 A1 | 9/2006 | Gibson | |
| 2006/0218283 A1 | 9/2006 | Jones | |
| 2006/0221176 A1 | 10/2006 | Di Pietro et al. | |
| 2006/0251229 A1 | 11/2006 | Gorti et al. | |
| 2006/0285533 A1 | 12/2006 | Divine et al. | |
| 2006/0286984 A1 | 12/2006 | Bonner | |
| 2007/0025270 A1 | 2/2007 | Sylvain | |
| 2007/0058613 A1 | 3/2007 | Beckemeyer | |
| 2007/0083658 A1 | 4/2007 | Hanna et al. | |
| 2007/0092073 A1* | 4/2007 | Olshansky et al. | 379/232 |
| 2007/0111723 A1 | 5/2007 | Ahmed et al. | |
| 2007/0143858 A1 | 6/2007 | Hearty | |
| 2008/0049724 A1 | 2/2008 | Tsujino et al. | |
| 2008/0126549 A1 | 5/2008 | Khanchandani et al. | |

OTHER PUBLICATIONS www.cisco.com/en/U/s/products/sw/voicesw/ps556/products_administration_guide, pp. 3-5 of 26, Oct. 24, 2007.

Rosenberg et al. "RFC 3261, SIP: Session Initiation Protocol", The Internet Society, Jun. 2002.

Newton's Telecom Dictionary 22nd Edition, p. 829, Feb. 2006.

Sparks, "RFC 3515—The Session Initiation Protocol (SIP) Refer Method," The Internet Society, Apr. 2003.

Mahy et al., "RFC 3891—The Session Initiation Protocol (SIP) 'Replaces' Header," The Internet Society, Sep. 2004.

Mahy et al, "RFC 3911—The Session Initiation Protocol (SIP) 'Join' Header," The Internet Society, Oct. 2004.

Handley et al., "RFC 2327—SDP: Session Description Protocol," The Internet Society, Apr. 1998.

Schulzrinne et al., "RFC 1889—RTP: A Transport Protocol for Real-Time Applications," The Internet Society, Jan. 1996.

Schulzrinne et al., "RFC 2833—RTP Payload for DTMF Digits, Telephony Tones and Telephony Signals," The Internet Society, May 2000.

Mahy et al., "draft-ietf-sip-join-03—The Session Initiation Protocol (SIP) "Join" Header," The Internet Society, Feb. 2004.

Mahy et al., "draft-ietf-sipping-cc-framework-03—A Call Control and Multi-party usage framework for the Session Initiation Protocol (SIP)," The Internet Society, Oct. 27, 2003.

Rosenberg, "RFC 3311—The Session Initiation Protocol (SIP) Update Method," The Internet Society, Sep. 2002.

Rosenberg et al., "RFC 3262—Reliability of Provisional Responses in the Session Initiation Protocol (SIP)," The Internet Society, Jun. 2002.

Jennings et al., "RFC 3325—Private Extensions to the Session Initation Protocol (SIP) for Asserted Identity within Trusted Networks," The Internet Society, Nov. 2002.

Harrington et al., "RFC 3411—An Architecture for Describing Simple Network Management Protocol (SNMP) Management Frameworks," The Internet Society, Dec. 2002.

Rosenberg et al., "RFC 3840—Indicating User Agent Capabilities in the Session Initiation Protocol (SIP)," The Internet Society, Aug. 2004.

Mahy, "RFC 3842—A Message Summary and Message Waiting Indication Event Package for the Session Initiation Protocol (SIP)," The Internet Society, Aug. 2004.

"SR-504: SPCS Capabilities and Features," Telcordia Technologies, Issue 1, Mar. 1996.

"SR-3065: LSSGR Guide," Telcordia Technologies, Issue 7, Aug. 2003.

Mahy et al., "draft-ietf-sip-replaces-05—The Session Initiation Protocol (SIP) "Replaces" Header," The Internet Society, Feb. 16, 2004.

Schulzrinne, "draft-ietf-sipping-sos-00—Emergency Services URI for the Session Initiation Protocol," The Internet Society, Feb. 8, 2004.

Rosenberg et al., "draft-ietf-sipping-dialog-package-04—An INVITE Inititiated Dialog Event Package for the Session Initiation Protocol (SIP)," The Internet Society, Feb. 13, 2004.

Lingle et al., "draft-ietf-sip-mib-08—Management Information Base for Session Initiation Protocol (SIP)," The Internet Society, Jul. 16, 2004.

Johnston et al., "draft-ietf-sipping-cc-conferencing-04—Session Initiation Protocol Call Control—Conferencing for User Agents," The Internet Society, Jul. 18, 2004.

Sparks et al., "draft-ietf-sipping-cc-transfer-02—Session Initiation Protocol Call Control—Transfer," The Internet Society, Feb. 15, 2004.

Rosenberg et al., "draft-ietf-sipping-conference-package-04—A Session Initiation Protocol (SIP) Event Package for Conference State," The Internet Society, May 21, 2004.

Petrie, "draft-ietf-sipping-config-framework-04—A Framework for Session Initiation Protocol User Agent Profile Delivery," The Internet Society, Jul. 19, 2004.

"GR-1298-CORE—AINGR: Switching Systems," Telcordia Technologies, Issue 6, Nov. 2000.

* cited by examiner

METHOD AND SYSTEM FOR PROVIDING CALL SCREENING IN A PACKET-SWITCHED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a packet switched and/or packet-based network such as a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides call screening in packet-switched and/or packet-based networks.

Figure 1:
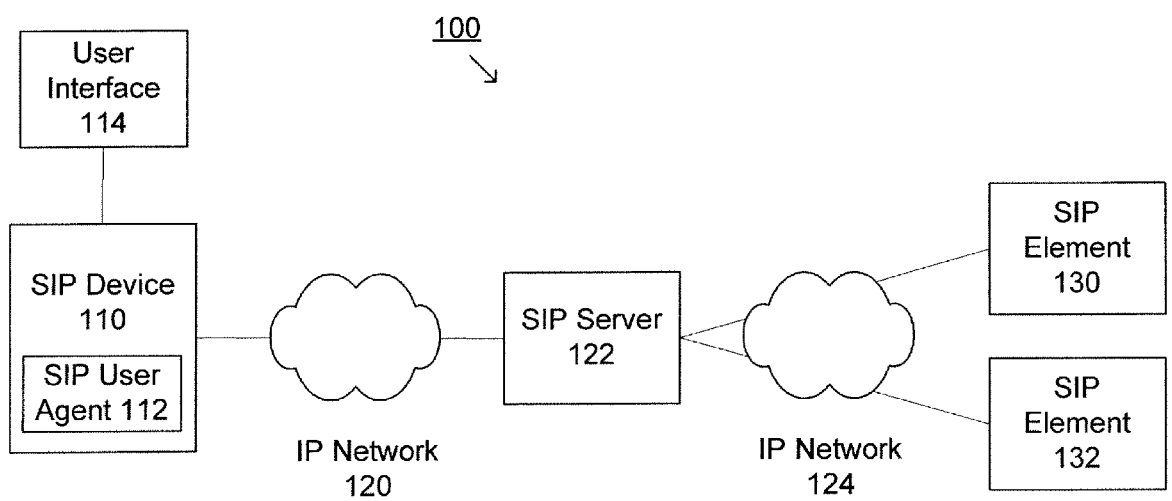
FIG. 1 illustrates an exemplary SIP-based network system, according to an embodiment of the present invention.

FIG. 1 is an exemplary SIP-based network system, according to an embodiment of the present invention. System 100 illustrates an exemplary system for supporting SIP communication, in particular providing call screening in SIP communication. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voice-band or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

Figure 2:
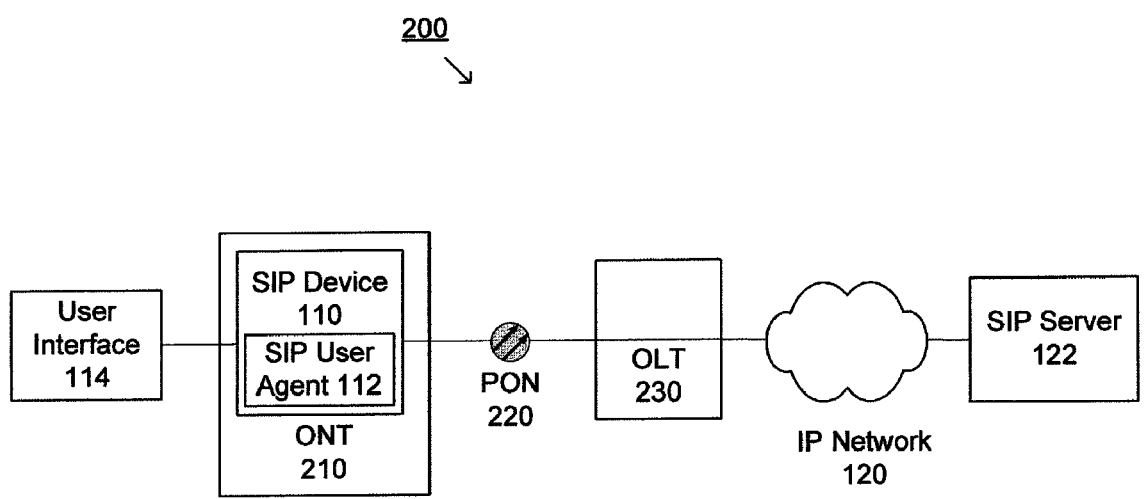
FIG. 2 illustrates an exemplary implementation where a SIP Device is embedded in a FTTP network, according to an embodiment of the present invention.
Figure 3:
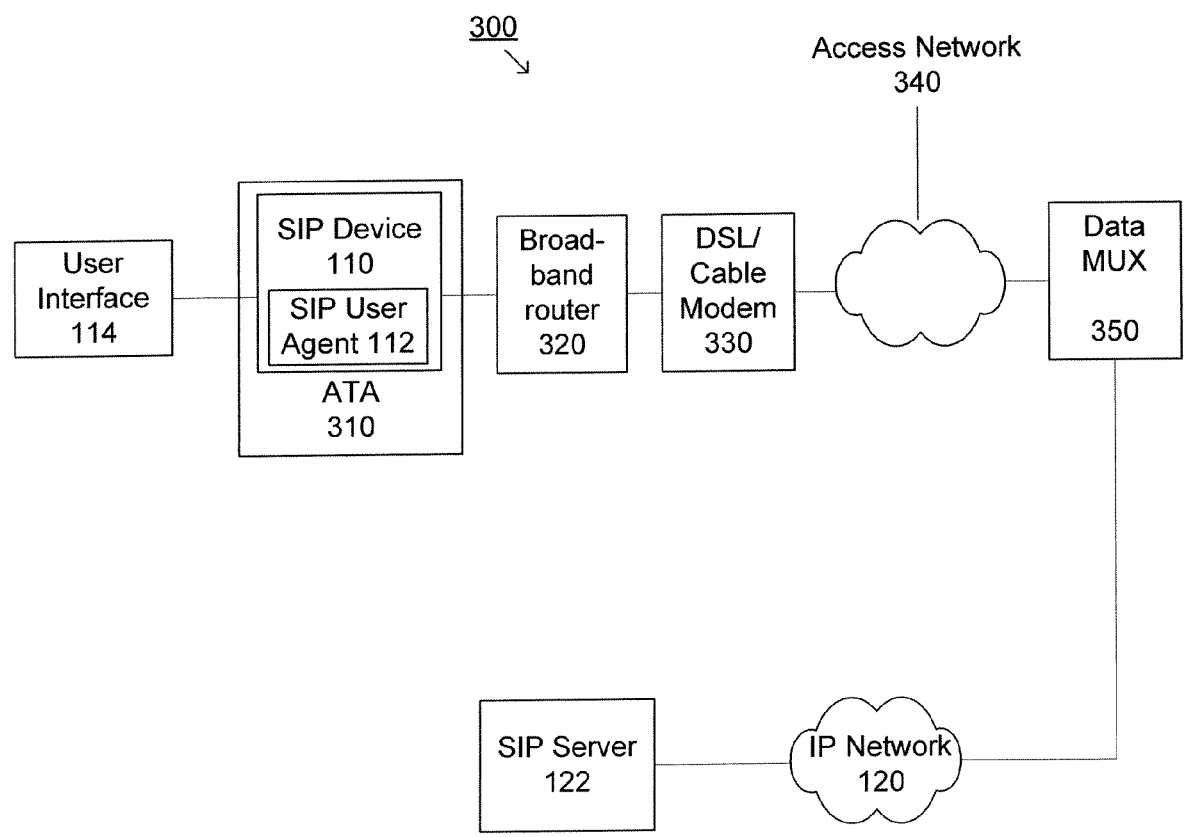
FIG. 3 illustrates an exemplary implementation where a SIP Device is embedded in an ATA device connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 with a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the IP transport network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

Figure 4:
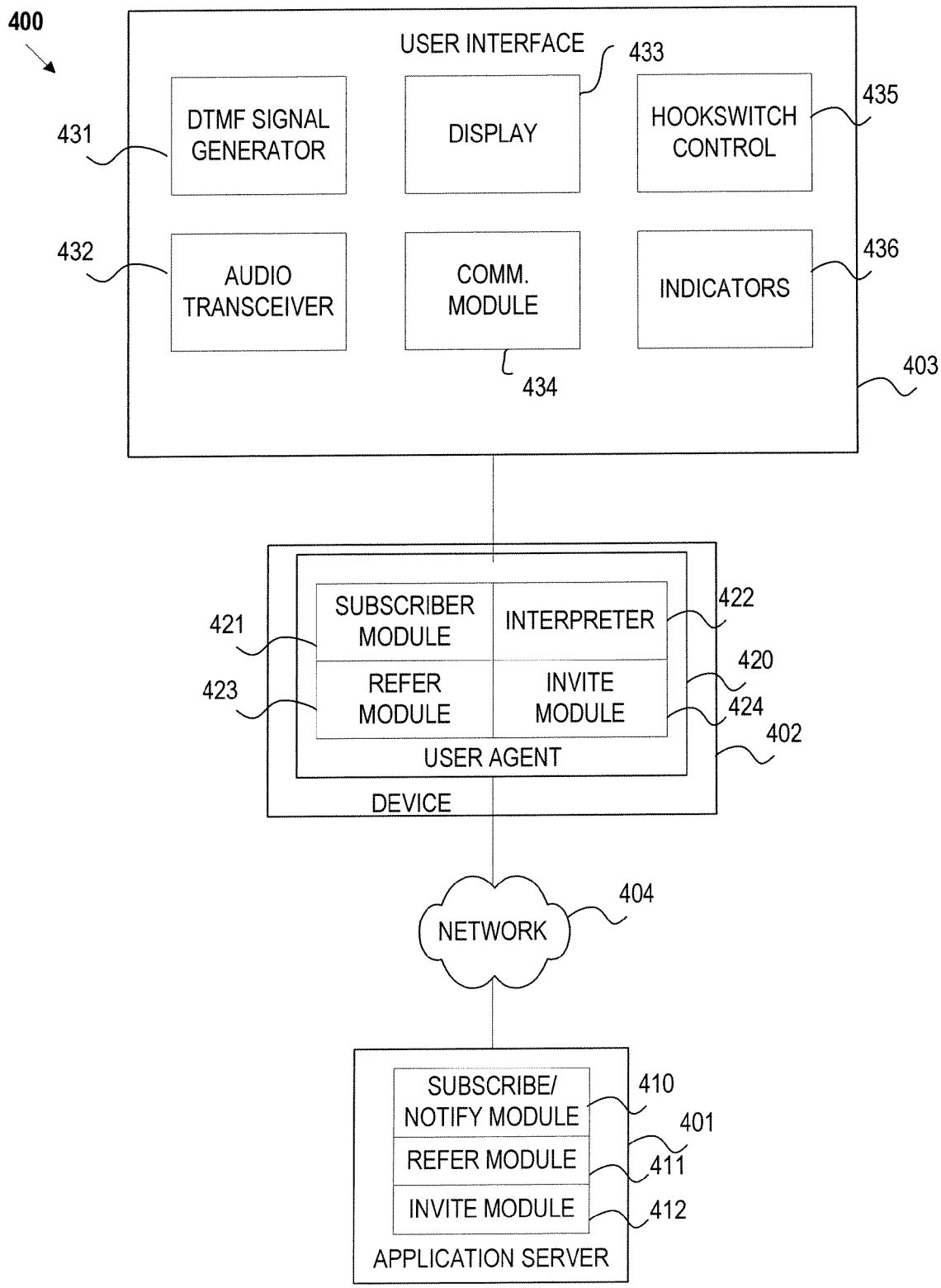
FIG. 4 illustrates an exemplary system for providing call screening, according to an embodiment of the present invention.

FIG. 4 depicts an exemplary system 400 for providing call screening according to various embodiments. As shown in FIG. 4, system 400 may include an application server 401, a device 402, and a user interface 403. Further, as shown in FIG. 4, application server 401 and device 402 may be coupled via a network 404. In various exemplary embodiments, network 404 may be a packet-switched and/or packed based network such as, for example, an IP network, SIP network, a VoIP network and/or the like. For example, network 404 may encompass PON 220, access network 340 and/or transport IP network 120, as shown in FIGS. 2 and 3.

Application server 401 may include network elements (not shown in FIG. 4) that provide services to users. While application server 401 is illustrated as a single element in FIG. 4, application server 401 may be comprised of multiple elements including, but not limited to, for example, SIP registrars, location servers, proxy servers, back-to-back user agents, and/or the like. As shown in FIG. 4, application server 401 may include a subscribe/notify module 410 to receive and transmit SUBSCRIBE and NOTIFY requests as will be described in greater detail below. Application server 401 may also include a refer module to transmit and receive REFER requests as will be described in greater detail below. Application server 401 may also include an invite module 412 to transmit INVITE requests as will be described in greater detail below.

According to various embodiments, device 402 may be an instrument through which an end user may connect to network 404 to send and receive calls and avail the end user of services (e.g., a collection of behaviors to be applied to communications requests on behalf of an end user) that may be provided. Device 402 may include a user agent 420. User agent 420 may include a subscriber module 421, an interpreter 422 a refer module 423 and an invite module 424. In an exemplary embodiment, subscriber module 421, interpreter 422, refer module 423 and invite module 424 may comprise a single module to receive and transmit SUBSCRIBE, NOTIFY, REFER and INVITE requests to enable call screening, for example. In an exemplary embodiment, user agent 420 may be a SIP construct that represents a device in a SIP-based network, for example. In such an embodiment, user agent 420 may be coupled with a network and a user interface, as shown in FIG. 4.

User interface 403 may provide a facility through which a user interacts with the user interface in order to initiate and receive voice communications. In an exemplary embodiment, user interface 403 may be a telephone or like device. Also, user interface 403 may include a computer emulating a telephone, for example. As shown in FIG. 4, user interface 403 may include a dual-tone multi-frequency (DTMF) signal generator 431, an audio transceiver 432, a display 433, a communications module 434, a hookswitch control 435, and indicators 436.

In an exemplary embodiment, DTMF signal generator 431 may include twelve DTMF keys or a rotary dial similar to those on conventional telephones. In such an embodiment, a user may press the DTMF keys or move the rotary dial, respectively, to generate DTMF signals. Also, DTMF signal generator 431 may include a computer emulating twelve DTMF keys. In such an embodiment, a user may interact with the computer to generate DTMF signals.

Audio transceiver 432 may provide a facility to transmit and receive audio signals. In an exemplary embodiment, audio transceiver may include a microphone, earphone, speaker, and/or the like.

Display 433 may display verbal and/or graphical messages to the user. For example, display 403 may display the phrase "Screen Call?" to a user to invite the user to screen a call that is being forwarded. Also, display 403 may serve as a caller identification display, capable of displaying the name and number associated with an incoming call.

Communications module 434 may provide a facility to communicate with device 402 and/or user agent 420. Communications module 434 may include an analog telephone port, a wireless port, or any other means for coupling user interface 403 with device 402 and/or user agent 420, for example.

Hookswitch control 435 may perform the functions of a traditional hookswitch, which may include, e.g., initiating a call, terminating a call, and accessing a service within a call (e.g., the function of a "flash" button). For example, hookswitch control 435 may be used to request that a forwarded call be screened, a screening party conference into the call, and/or that forwarded destination be ejected from a conferenced call as will be described in greater detail below.

Indicators 436 may provide indications to the user regarding the services provided. For example, indicators 436 may provide a message waiting indicator, an indication that a service (e.g., call forwarding) is active or inactive, or the like. Indicators 436 may include indicator lights, for example, and/or graphical representations that may appear on the display.

As noted above, subscribe/notify module 410 and subscriber module 421 may receive and transmit SUBSCRIBE and NOTIFY requests. In an exemplary embodiment, the modules may receive and transmit SUBSCRIBE and NOTIFY requests in accordance with the Internet Engineering Task Force's (IETF) Request for Comment (RFC) No. 3265 entitled "SIP-Specific Event Notification," the contents of which is incorporated herein by reference. In such an embodiment, the user agent may subscribe to services for various resources or calls in the network, for example, thus enabling the user agent to receive notifications regarding the service. For example, the user agent may subscribe to a "call-forwarding-indicator" service to receive a notification when the status of the call forwarding service changes and/or a "call-redirection-reminder" service to receive a notification when a call is forwarded.

According to this exemplary SUBSCRIBE/NOTIFY capability, a subscriber may be a user agent that receives NOTIFY requests from notifiers (e.g., an application server). The NOTIFY request may contain information about the state of a resource and/or service in which the subscriber is interested. A subscriber may generate SUBSCRIBE requests and transmit the SUBSCRIBE requests to create subscriptions. A notifier may generate notification requests for the purpose of notifying subscribers of the state of a resource and/or service. A notifier may also accept SUBSCRIBE requests to create subscriptions. An event package may refer to an specification that defines a set of state information to be reported by a notifier to a subscriber.

In an exemplary embodiment, SUBSCRIBE requests may include an "Event" header and an "Accept" header, for example. In such an embodiment, the "Event" header may indicate which event or class of events to which the subscriber is subscribing. Also, the "Event" header may include a token which indicates the type of state for which a subscription is being requested. An "Accept" header may indicate the body formats allowed in subsequent NOTIFY requests.

SUBSCRIBE requests may be a dialog-creating method. For example, when a subscriber wishes to subscribe to a particular service, the subscriber may form and transmit a SUBSCRIBE message. This SUBSCRIBE request may then be confirmed with a final response in the form of a NOTIFY request, for example.

In an exemplary embodiment, NOTIFY requests and/or messages may be sent to inform subscribers of changes in state to which the subscriber has a subscription. In such an embodiment, a NOTIFY may not terminate the corresponding subscription. NOTIFY requests may contain "Event" headers that may contain an event package name for which a notification is being generated, for example. The "Event" package name may correspond to the "Event" header in the corresponding SUBSCRIBE message. NOTIFY requests may also contain "Content-Type" headers which may indicate a body format, and may also contain bodies that may contain the state of the subscribed resource and/or service.

In addition to the SUBSCRIBE/NOTIFY capabilities, refer module 411 of application server 401 and refer module 423 of user agent 420 may receive and transmit REFER requests. In an exemplary embodiment, the modules may receive an transmit REFER requests in accordance with IETF RFC No. 3515 entitled "The SIP Refer Method," the contents of which is incorporated herein by reference.

In such an embodiment, a user agent, for example, may request that the recipient of the REFER request REFER to a resource provided in the request. The REFER request may enable the transmitting party to be notified of the outcome of the referenced request, as well.

In an exemplary embodiment, REFER may indicate that the recipient (identified by a request Uniform Resource Indicator (URI)) should contact a third party using the contact information provided. For example, an original or intended destination of a call may transmit a REFER request to a server to request that the server contact a forwarded destination to enable the original destination to screen a call as will be discussed in greater detail below. A REFER request may contain a "Refer-to" header field to identify the third-party to be contacted.

As noted above, invite module 412 of application server 401 and invite module 424 of user agent 420 may transmit and receive INVITE requests to create a dialog between the user agent and the server, for example. In an exemplary embodiment, other elements in an exemplary system for call screening (e.g., a caller and a forwarded destination) may contain invite modules to create dialogs between the server and the caller and the forwarded destination. In an exemplary embodiment, INVITE requests may be used to create dialogs between elements in a system for call screening as will be described in greater detail below.

Figure 5:
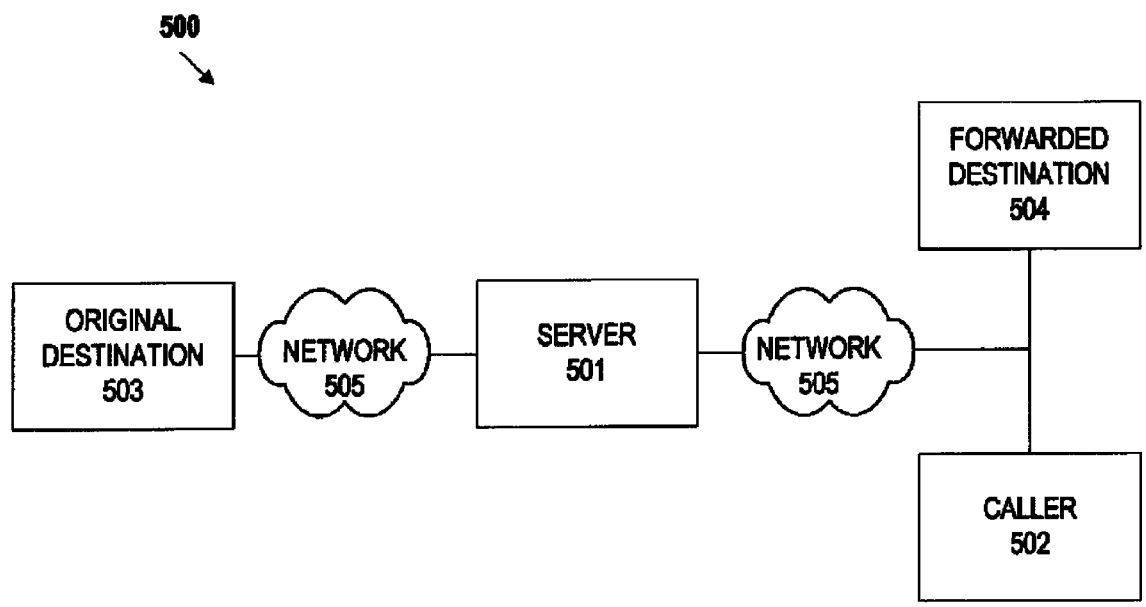
FIG. 5 illustrates an exemplary system for providing call screening, according to an embodiment of the present invention.

Various embodiments provide for call screening in a packet-switched network. In these embodiments, the screening party (e.g., an original destination) may also conference into the forwarded call and/or eject the forwarded destination from the call, for example. FIG. 5 depicts an exemplary system 500 for screening calls in, for example, packet-switched network 505. The example of FIG. 5 illustrates a calling party 502, an original destination 503 and a forwarded destination 504, each of which may comprise a user agent (e.g., user agent 420) and/or a user interface (e.g., user interface 403) having facilities and functionality as described above. FIG. 5 further illustrates a server 501 (e.g., application server 401) that is associated with original destination 503, which may include facilities and functionality as described above.

In the exemplary embodiment of FIG. 5, when caller 502 calls original destination 503, for example, caller 502 may transmit a SIP INVITE request to server 501. When the SIP INVITE request arrives at server 501, a dialog may be created between caller 502 and server 501. Server 501 may then transmit a SIP INVITE request to original destination 503, which may also create a dialog between server 501 and original destination 503.

In such an embodiment, server 501 may provide a call forwarding service on behalf of original destination 503. When call forwarding is active, if server 501 receives an INVITE request from caller 502, for example, it may not send an INVITE request to original destination 503. Instead, server 501 may send an INVITE request to forwarded destination 504. Server 501 may then interconnect the two dialogs to allow all audio data to be exchanged between caller 502 and forwarded destination 504. Also, if original destination 503 has configured the call forwarding service to forward calls after an interval of time passes before the original destination 503 answers the call, server 501 may cancel an INVITE request sent to original destination 503 and forward the call to forwarded destination 504. For example, if original destination 503 does not answer a call after a predetermined number of rings, server 501 may forward the call to forwarded destination 504, which may be a voice mail box and/or voice mail system.

In an exemplary embodiment, system 500 may support a call screening service that may allow the original destination 503 to listen in on a call that has been forwarded to forwarded destination 504. In such an embodiment, server 501 may send notification to original destination 503 when server 501 has forwarded a call to forwarded destination 504, for example. To receive this notification, original destination 503 may subscribe to a "Forwarded Call Event" service in accordance with the SUBSCRIBE/NOTIFY capability described above. For example, the user agent of original destination 503 may transmit a SUBSCRIBE request to server 501 to subscribe to the service.

Figure 6:
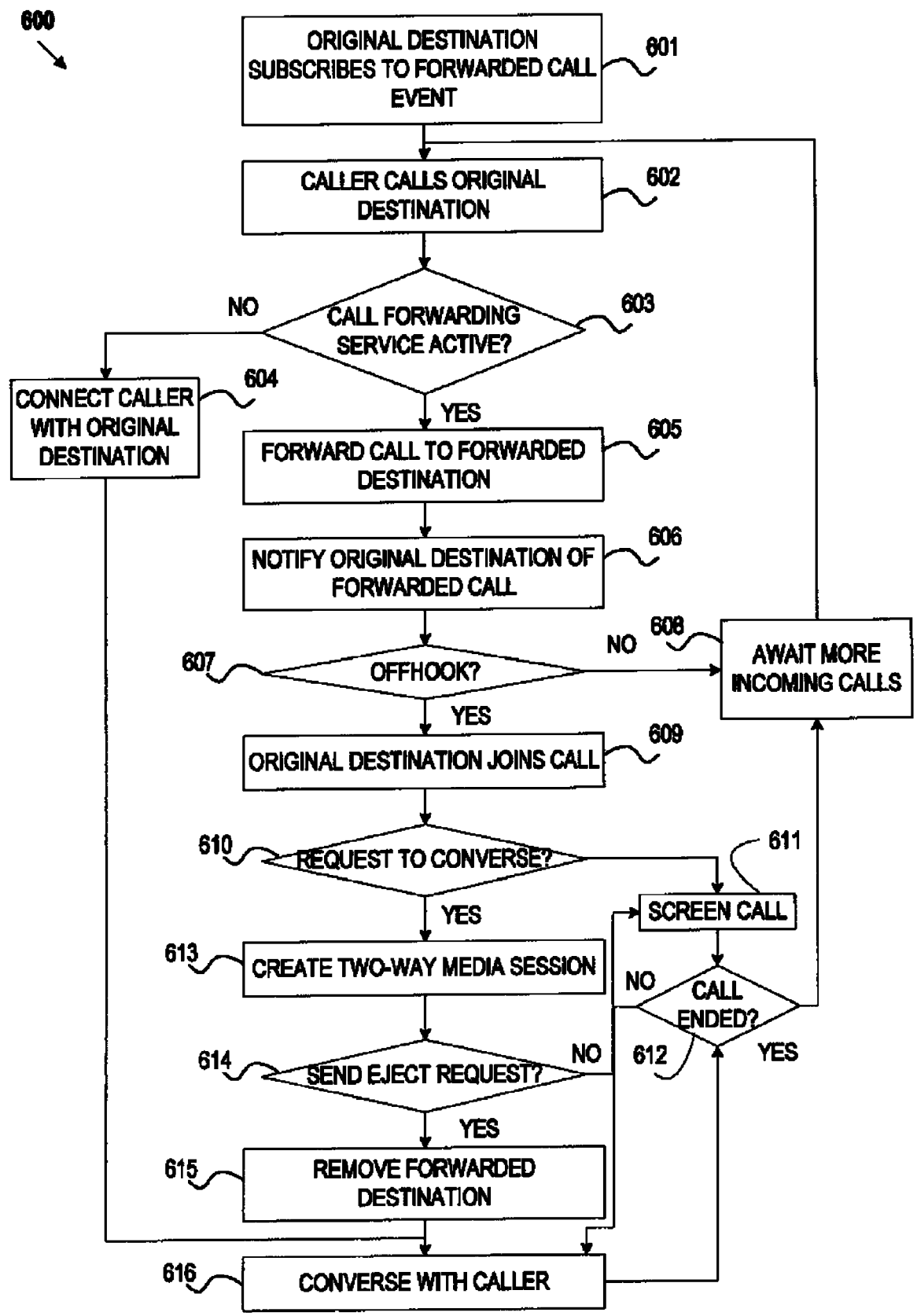
FIG. 6 illustrates an exemplary method for providing call screening, according to an embodiment of the present invention.

FIG. 6 depicts flow chart 600 which illustrates an exemplary embodiment of a method for screening a call according to various embodiments of the invention. The exemplary embodiment of FIG. 6 is illustrated in the context of an original destination which includes a SIP Device having a user agent such as described above with respect to FIG. 4 and a user interface implementing a feature set such as described above with respect to user interface 403. Other systems may also be used.

In block 601, an originating destination (e.g., subscriber) may subscribe to a forwarded call event service associated with call forwarding as described above. For example, a user agent associated with an original destination may submit a SUBSCRIBE request to a server, such as an application server or SIP server, and the server may confirm the subscription as described above. The forwarded call event service may enable the original destination to receive notification of a forwarded call and screen the forwarded call. The user agent of the original destination may be pre-programmed to submit such a SUBSCRIBE request, or may receive configuration information or other instructions which instruct the user agent to submit such a SUBSCRIBE request. The server associated with the original destination may also authenticate and/or authorize the SUBSCRIBE request prior to enabling the call screening service.

In block 602, original destination may be called by a caller, for example. In an exemplary embodiment, a caller may transmit an INVITE request to a server to create a dialog between the caller and the server.

In block 603, the server may determine whether call forwarding is active for the original destination. For example, prior to receiving the call, a user associated with the original destination may use a user interface to activate the call forwarding service for the original destination. If call forwarding is not active, in block 604, the server may connect the caller with the original destination, for example, by transmitting an INVITE request to the original destination to create a dialog between the server and the original destination. The server may then interconnect the dialogs the server has with the caller and the original destination to enable an exchange of audio data between the caller and the original destination, for example.

If call forwarding is active, in block 605, the call may be forwarded to the forwarded destination. To forward the call to the forwarded destination, the server may transmit an INVITE request to the forwarded destination to create a dialog between the server and the forwarded destination. The server may then interconnect the dialogs the server has with the caller and the forwarded destination to enable an exchange of audio data between the caller and the forwarded destination, for example.

In block 606, the original destination may be notified of the forwarded call. In an exemplary embodiment the original destination may receive a notification of the forwarded call because the original destination has subscribed to the Forwarded Call Event server in block 601, for example. To notify the original destination of the forwarded call, the server may construct a Forwarded Call Event that may include an identifier of the dialog between the caller and the server, the address of record for the forwarded destination, and a time limit defining the time for allowing the original destination to screen the call. The server may then transmit the Forwarded Call Event in a NOTIFY request to the original destination, where it is received by the user agent associated with the original destination.

In block 607, it may be determined whether the original destination has gone "offhook" before a predetermined period of time expires (e.g., the time limit identified in the NOTIFY request). In an exemplary embodiment, a hookswitch control of a user interface may interact with SIP Device and a user agent, for example, to detect the offhook condition at the user interface and to notify the server that the original destination has gone offhook. Also, the predetermined time period may be associated with an interval of time (e.g., 10 seconds) or a number of rings, for example. If the original destination does not go offhook and the time limit expires, the forwarded call may not be screened. Further, the original destination may await additional incoming calls in block 608, and when an incoming call occurs, flow chart 600 may proceed to block 602. If the original destination goes offhook before the time limit expires, the original destination may screen the call in block 609.

In block 609, to enable the original destination to join the forwarded call, the user agent of the original destination may transmit an INVITE request to the address of record of the original destination at the server. In an exemplary embodiment, the INVITE request may include a "Join" header that identifies the dialog between the server and the caller and a session description that may specify one-way media such that the original destination only receives audio. The server may then accept the INVITE request from the original destination to create a dialog between the original destination and the server. Also, in an exemplary embodiment, the server may interpret the "Join" header as a request to create a three-way conference including the dialogs between the server and the caller, original destination and forwarded destination.

The server may then create the requested conference. In an exemplary embodiment, to create the conference, the server may construct a conference URI which may server as a unique SIP address for the conference within the server, for example. The server may then send, for example, a "200 OK" response to the original destination. In an exemplary embodiment, the response may include a "Contact" header that may specify the conference URI. Also, the "Contact" header may include an "infocus" parameter to signify that the URI is a conference URI. Once the original destination receives the response, the SIP Device of the original destination may use the URI to establish an audio data connection to the existing audio data being exchanged by the caller and the forwarded destination in order to "screen" or listen to the audio exchange between the caller and the forwarded destination. The original destination may continue to screen the call in block 611 until the call is terminated in block 612, for example.

In the embodiment as described above, where there is a one-way media session, the original destination may be prevented from transmitting audio to either the caller or the forwarded destination. In other words, the one-way media session may prevent the original destination from "speaking" to either party.

In a further exemplary embodiment, the original destination may be able to join the conference and transmit audio to the caller and/or the forwarded destination, for example. In block 610, the original destination may request to converse with the caller and/or the forwarded destination. In an exemplary embodiment, to make the request, the original destination may perform a hookswitch flash, for example, using the hookswitch controls of the user interface. The SIP Device may detect the hookswitch clash and interpret it as a request to converse.

In block 613, to create a two-way media session, the user agent of the original destination may transmit a re-INVITE request to the server in the dialog between the original destination and the server, for example. In the re-INVITE request, the original destination may alter the session description to specify a two-way media session. When the re-INVITE is received by the server, the original device may be able to transmit audio to the caller and/or the forwarded destination. In block 616, the original destination may converse with the caller until the call terminates in block 612.

In a further exemplary embodiment, the original destination may eject the forwarded destination to create a dialog solely between the original destination and the caller. For example, where the forwarded destination is a voice mail system the original destination may want to eject the voice mail system so that the original destination may converse with the caller. In block 614, it may be determined whether the original destination has requested to eject the forwarded destination from the call. In an exemplary embodiment, to eject the forwarded destination, the original destination may perform a hookswitch flash using, for example, the hookswitch controls of a user interface. The SIP Device may interpret the hookswitch flash as a request to eject the forwarded destination from the call session. On detection of a request to eject, in block 615 a user agent of the original destination may transmit a REFER request to the conference URI in the server. The REFER request may specify the address of record of the forwarded destination as the "refer-to" URI, for example. The REFER request may also specify BYE as the method. The server may receive the REFER request and transmit a BYE request to the forwarded destination to terminate the dialog between the server and the forwarded destination and remove the forwarded destination from the call.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   determining whether a call in a packet-switched network to a first destination is to be forwarded, based at least in part on an activated call forwarding service associated with the first destination;
   forwarding the call to a second destination based on a determination that the call is to be forwarded;
   notifying the first destination that the call has been forwarded;
   receiving a request from the first destination to screen the call; and
   enabling the first destination to screen the call, wherein the enabling comprises transmitting an invite request from the first destination, the invite request comprising an identification of a dialog between a caller of the call and a server in the packet-switched network.

2. The method according to claim 1, wherein the notifying comprises:
   transmitting a notification message to the first destination, the notification message including at least one of an identification of a dialog between a caller of the call and a server in the packet-switched network associated with forwarding the call, an address of the second destination, and a constraint associated with screening the call.

3. The method according to claim 2, wherein the constraint associated with screening the call comprises a time limit for enabling the first destination to screen the call.

4. The method according to claim 1, wherein the request from the first destination to screen the call comprises an invite request.

5. The method according to claim 4, wherein the request from the first destination to screen the call further comprises an identification of a dialog between a caller of the call and a server in the packet-switched network associated with forwarding the call.

6. The method according to claim 1, wherein the enabling comprises transmitting audio data to the first destination.

7. The method according to claim 1, wherein the invite request further comprises an indication that the first destination is to receive audio data.

8. The method according to claim 7, the enabling further comprising:
   constructing a uniform resource identifier associated with the call; and
   transmitting the uniform resource identifier associated with the call to the first destination.

9. The method according to claim 1, further comprising:
   receiving a request from the first destination to transmit audio data to at least one of the second destination or a caller associated with the call.

10. The method according to claim 9, wherein the request to transmit audio data comprises an invite request, the invite request comprising an indication that the first destination is to transmit audio data to at least one of the second destination or a caller associated with the call.

11. The method according to claim 1, further comprising:
    receiving a request to remove the second destination from the call.

12. The method according to claim 11, wherein the request to remove the second destination from the call comprises a refer request, the refer request comprising an address of the second destination and an indication to remove the second destination.

13. The method according to claim 1, further comprising:
    receiving a subscribe request from the first destination, the subscribe request being associated with receiving a notification that a call to the first destination has been forwarded.

14. A system, comprising:
    a packet-switched network;
    a first destination accessible via the packet-switched network, wherein the first destination includes an activated call forwarding service;
    a second destination accessible via the packet-switched network;
    a server coupled to the packet-switched network and configured to notify the first destination over the packet-switched network that a call directed to the first destination over the packet-switched network has been forwarded to the second destination and enable the first destination to screen the call over the packet-switched network, wherein enable the first destination to screen the call comprises transmitting an invite request from the first destination, the invite request comprising an identification of a dialog between a caller of the call and a server in the packet-switched network.

15. The method according to claim 1, wherein the activation of the call forwarding service associated with the first destination comprises transmitting a subscribe request based at least in part on pre-programmed instructions.

16. The method according to claim 1, wherein the activation of the call forwarding service associated with the first destination comprises transmitting a subscribe request based at least in part on received configuration instructions.

17. The method according to claim 1, further comprising:
    receiving a request from the first destination to transmit audio data to the second destination and to a caller associated with the call.

* * * * *